US011911878B2

(12) United States Patent
Buchanan

(10) Patent No.: US 11,911,878 B2
(45) Date of Patent: Feb. 27, 2024

(54) RATCHET WRENCHES

(71) Applicant: Nigel Buchanan, Fife (GB)

(72) Inventor: Nigel Buchanan, Fife (GB)

( * ) Notice: Subject to any disclaimer, the term of this patent is extended or adjusted under 35 U.S.C. 154(b) by 0 days.

(21) Appl. No.: 17/012,774

(22) Filed: Sep. 4, 2020

(65) Prior Publication Data

US 2020/0398407 A1 Dec. 24, 2020

Related U.S. Application Data

(63) Continuation of application No. 15/773,760, filed as application No. PCT/GB2016/053437 on Nov. 4, 2016, now Pat. No. 10,766,124.

(30) Foreign Application Priority Data

Nov. 4, 2015 (GB) ..................................... 1519472
Nov. 4, 2015 (GB) ..................................... 1519474

(51) Int. Cl.
*B25B 13/46* (2006.01)
*B25B 13/04* (2006.01)

(52) U.S. Cl.
CPC ............ *B25B 13/465* (2013.01); *B25B 13/04* (2013.01); *B25B 13/462* (2013.01); *B25B 13/461* (2013.01); *B25B 13/463* (2013.01)

(58) Field of Classification Search
CPC ..... B25B 13/462; B25B 13/461; B25B 13/04; B25B 13/46; B25B 13/463; B25B 13/465; B25G 1/066; B25G 1/105; F16D 41/06
USPC ............... 81/58.1, 59.1, 58.3, 58.4, 60, 63.2
See application file for complete search history.

(56) References Cited

U.S. PATENT DOCUMENTS

| | | | | |
|---|---|---|---|---|
| 3,447,650 | A | 6/1969 | Dossier | |
| 6,488,136 | B2 | 12/2002 | Chang | |
| 6,502,485 | B1 | 1/2003 | Salazar | |
| 6,644,148 | B2 | 11/2003 | Hu | |
| 6,691,848 | B1 | 1/2004 | Eyraud | |
| 6,769,330 | B2 | 8/2004 | Chang | |
| 7,197,964 | B2 | 4/2007 | Buchanan | |
| 9,140,317 | B2 | 9/2015 | Buchanan | |
| 9,415,486 | B2 * | 8/2016 | Ludtke | B25B 13/462 |
| 2005/0115366 | A1 | 6/2005 | Chaconas | |
| 2012/0297934 | A1 | 11/2012 | Peirce | |
| 2013/0340574 | A1 | 12/2013 | Buchanan | |
| 2015/0135908 | A1 | 5/2015 | Solar | |

FOREIGN PATENT DOCUMENTS

| | | | |
|---|---|---|---|
| DE | 202012104590 U1 | 5/2013 | |
| FR | 598783 A | 12/1925 | |
| GB | 648163 A | 12/1950 | |
| GB | 2399782 A | 9/2004 | |

* cited by examiner

*Primary Examiner* — Lee D Wilson
*Assistant Examiner* — Robert F Neibaur
(74) *Attorney, Agent, or Firm* — Patterson Intellectual Property Law, PC; Emily A. Shouse

(57) ABSTRACT

A ratchet wrench (1) has a flexible clutch ring (500) that forms the mid part of a laminate-like structure comprising a wrench head (200), the clutch ring (500) and a drive element (40). When under load, the compression forces applied to the clutch ring (500) are substantially dissipated around its circumference (508) and inner surface (509), this inward force clamping upon the inherently strong drive outer surface (45). The laminate-like construction enables a reduction in the width or depth of the wrench head without a loss in strength.

12 Claims, 10 Drawing Sheets

RATCHET WRENCHES

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent applications which are hereby incorporated by reference: U.S. Ser. No. 15/773,760 filed Nov. 4, 2016, PCT/GB2016/053437 filed Nov. 4, 2016, GB 1519472.3 filed Nov. 4, 2015 and GB 1519474.9 filed Nov. 4, 2015.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The invention relates to wrench ratchet mechanisms and ratchet wrenches (often referred to in the United Kingdom as spanners.

BRIEF SUMMARY OF THE INVENTION

Known ratchet wrenches may comprise a wrench head that houses a driven member. The driven member may be provided with an aperture shaped to receive an item that is to be driven. For example, the aperture may be a hexagonal aperture sized to receive a particular size of fastener head/nut. Alternatively, the driven member may comprise a spigot that projects from the wrench head to allow the wrench head to be connected to a drive socket or the like. A resilient annular clutch may be disposed between the wrench head and driven member to transmit an applied torque from the wrench head to the driven member. When the wrench handle is turned in the drive direction to apply a torque to a fastener of the like, the clutch is deformed to lock the wrench head to the driven member to transmit the torque. When the wrench handle is turned in the opposite direction, the clutch springs back to allow relative movement of the wrench head and driven member to all repositioning of the wrench handle.

In order to avoid having an overly large wrench head, the resilient annular clutch may be a relatively thin sprung ring, which when subjected to repeated high torques is deformed to such an extent it becomes ineffective.

The annular clutch may have a series of fine teeth on its outer side to engage correspondingly fine teeth on the wrench head. There may for example be at least one hundred teeth on the annular clutch. Since such teeth are relatively fine, even a small amount of deformation of the annular clutch, for example as little as 0.01% makes it particularly likely to fail properly engage the teeth on the wrench head. Manufacturing a relatively thin annular clutch with fine teeth is not straightforward. One potential manufacturing method is metal injection molding MIM. MIM parts are molded from metal particles held together with a percentage of plasticizer or wax. The molded parts are subjected to a very high temperature in a vacuum oven during which the metal particles fuse and the plasticizer is burnt and vacuumed off. Even differences as small as 0.02% in the process produces variations in the finished size that may cause misalignment of the teeth when the annular clutch ring is forced into engagement with the wrench head.

A further problem with such ratchet wrenches is that the ingress of fine dust or grit quickly fouls the ratchet mechanism.

It is an object of the invention to at least partially alleviate one or more of the above-mentioned problems, or to provide an alternative to existing products. Embodiments of the invention may provide a more cost effective and reliable product.

The invention provides a wrench ratchet mechanism as specified in claim 1.

The wrench heads may have a laminate-like quality under load, thus permitting superior torque transmission or useful reduction in head size without sacrificing the load bearing capability of the wrench head. Laminates are inherently stronger than similar thickness materials due to the utilization of using metal grain structures in dissimilar grain directions (cross grain).

The toothed portion may be biased into engagement with teeth on the drive element or wrench head housing to provide at least substantially instantaneous engagement, or meshing, the instant a drive torque is applied to the wrench head.

The wrench head may be offset with respect to the handle providing a wrench head and handle profile that may be P-shaped. The offset arrangement with the wrench head to handle transition being thinner on one side may provide a thin walled wrench head with a relatively thin wall over a minimum of 50% of the housing circumference, resulting in a wrench head that can access fasteners in restricted access locations that cannot be accessed by known ratchet wrenches.

All of the teeth on the clutch ring may engage and disengage at the same time, providing stress equalization within the periphery of the clutch ring and housing teeth that lessens the likelihood of wear points developing.

The total movement of the clutch transmission ramps may be governed by a clutch protrusion received in a recess provided in the housing or the drive element. This may be particularly useful when the wrench is operated in the reverse direction as the gap between the ramps can be kept to a minimum reducing the level of play between reverse and drive functions.

Since the clutch ring has teeth around just a part of its circumference, the problem of the clutch ring elongation in use may be reduced. Also, the problems experienced in manufacturing relatively fine teeth are reduced, thereby reducing the manufacturing and warranty costs.

BRIEF DESCRIPTION OF THE SEVERAL VIEWS OF THE DRAWINGS

In order that the invention may be well understood, some embodiments, given by way of example only, will now be described with reference to the drawings, in which.

DETAILED DESCRIPTION OF THE INVENTION

Figure 1:
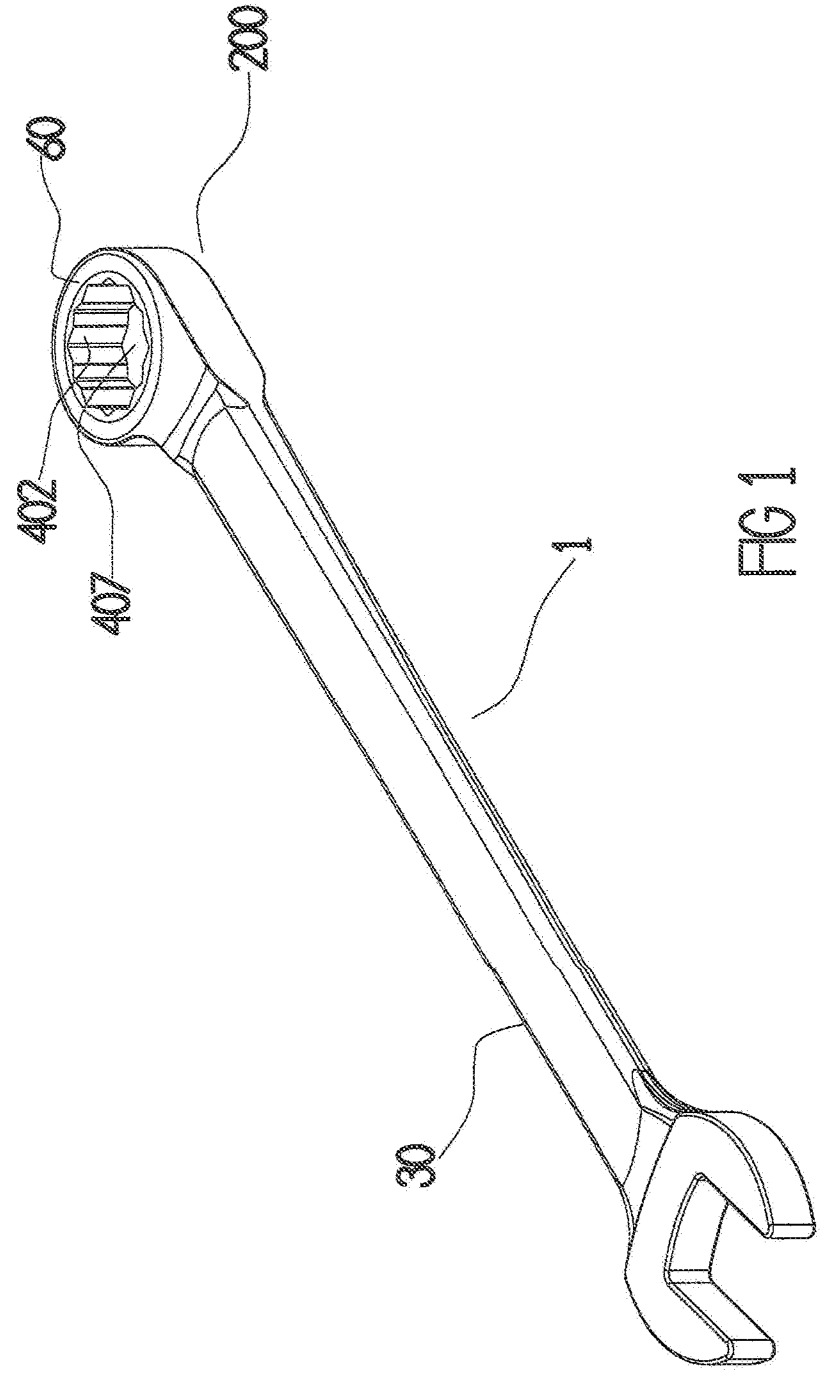
FIG. 1 is a perspective view of the ratchet wrench.

FIG. 1 show a ratchet wrench comprising a handle 30, wrench head 200, fastener engaging surfaces 402, a drive aperture 407 and a seal 60.

Figure 2:
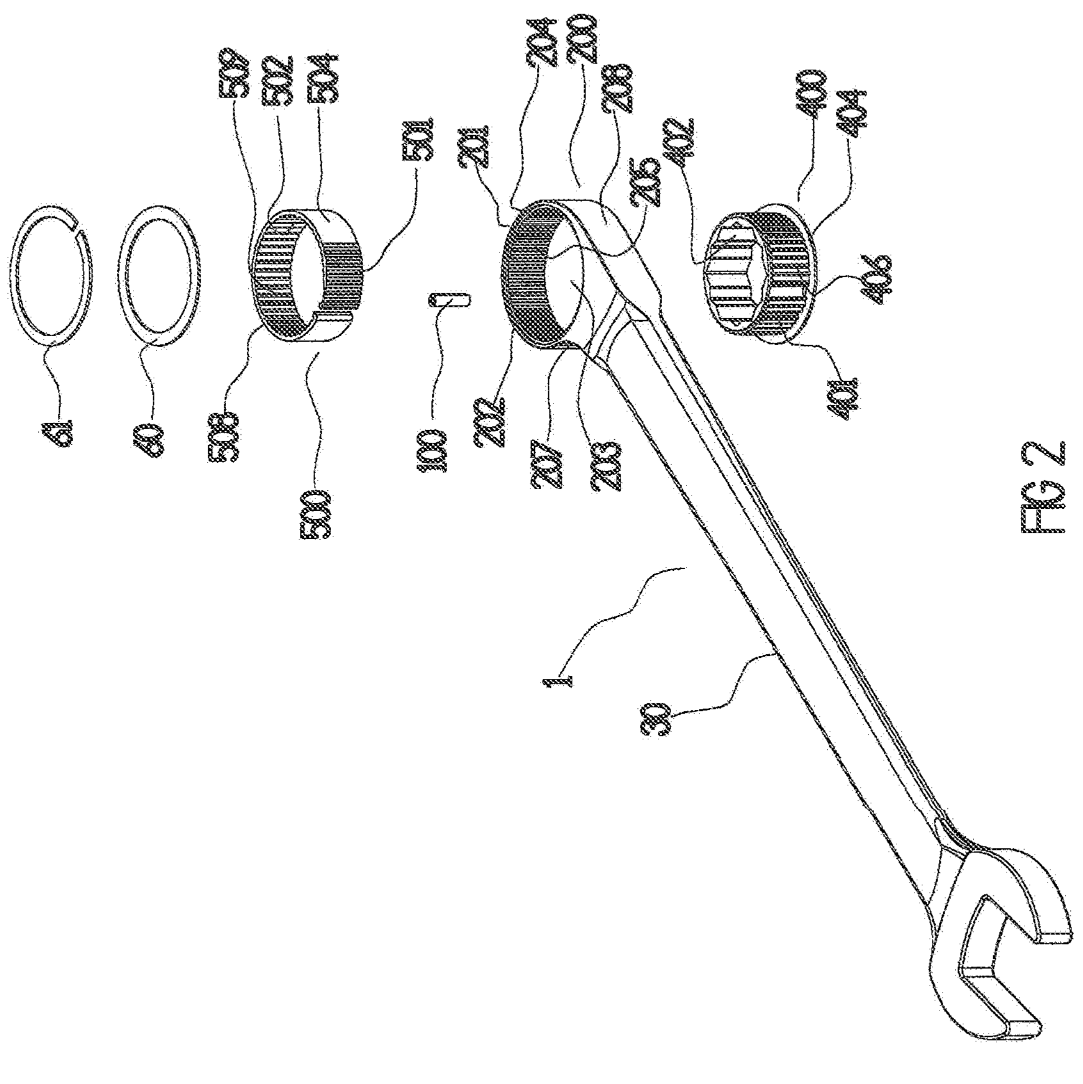
FIG. 2 is an exploded perspective view of the ratchet wrench of FIG. 1.

Referring to FIG. 2, the wrench head 200, comprises a housing 201 having a housing aperture 203 defined by a housing inner sidewall 205 that is provided with teeth 202. The wrench head has 200 has a seal retaining channel 204. The wrench head 200 has a first housing to handle connection 207 and a second housing to handle connection 208. The wrench head 200 is provided with a drive element 400, which defines the fastener engaging surfaces 402 and drive aperture 407. An outer sidewall 406 of the drive element 400 is provided with drive ramps 401 fastener engaging surfaces. A sealing portion 404 is provided at one end of the drive element 400. The wrench head 200 further comprises an annular clutch, which may be a split clutch ring 500. The clutch ring 500 has a clutch outer surface 508 provided with a clutch toothed portion 501 and clutch smooth portion 504. The clutch inner surface 509 is provided with clutch transmission ramps 502. A seal retainer 61 is provided to retain the seal 60 in the seal retaining channel 204. A resilient member which is illustrated as a roll spring 100, but may take other forms is provided for biasing an end of the clutch ring 500 towards the housing inner sidewall 205.

Figure 4:
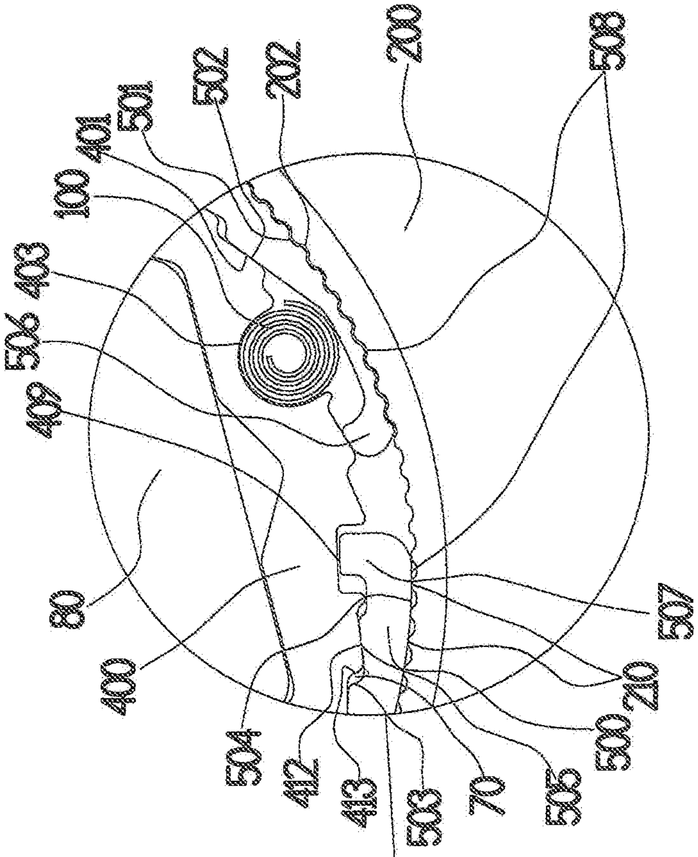
FIG. 4 is an enlargement of a portion of FIG. 3.
Figure 3:
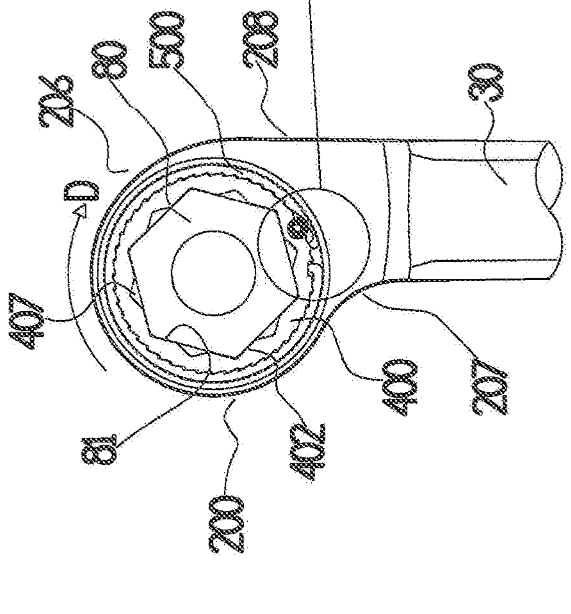
FIG. 3 is a top plan view of the wrench head of the ratchet wrench of FIG. 1 when being turned in a drive direction.
Figure 7:
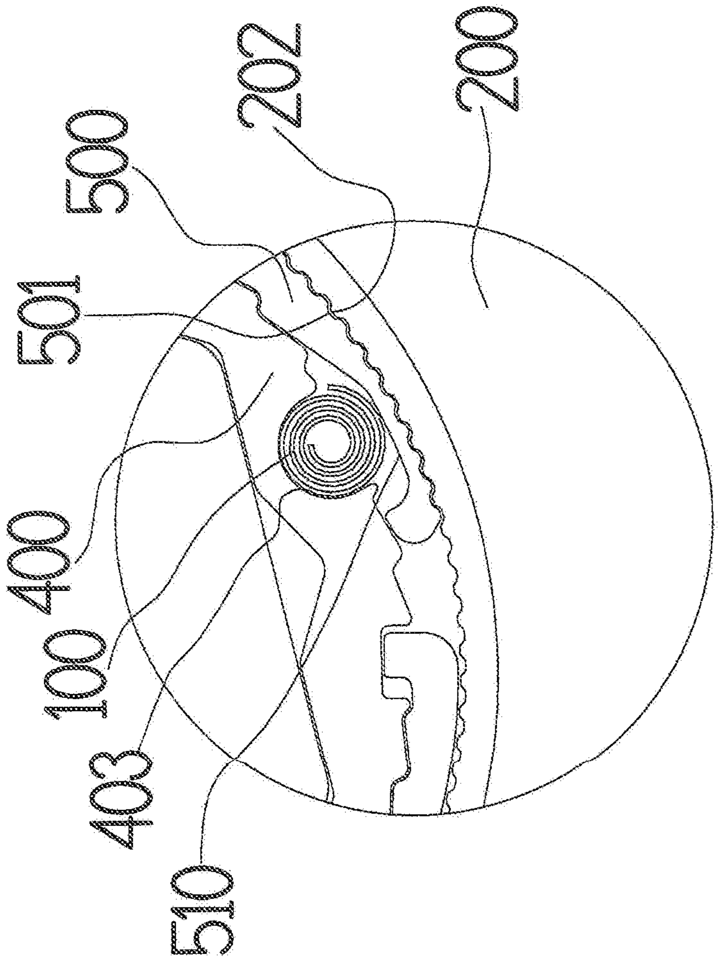
FIG. 7 is a view corresponding to FIG. 4 showing the wrench head in a rest condition.

FIGS. 3, 4 and 7 show the ratchet wrench 1 with the wrench head 200 being turned in the drive direction D. The seal 60 and seal retainer 61 have been omitted from the drawing to allow the parts below to be seen. The wrench head 200 has an offset housing 201. As can be seen in FIGS. 1 to 3, the offset housing 201 gives the ratchet wrench 1 a P-shaped profile. The first housing to handle connection 207 is subject to lower stresses than the second housing to handle connection 208 when the ratchet wrench is under load and so is thinner than the second housing to handle connection 208. The clutch toothed portion 501 is provided at a leading end 506 of the clutch ring (when viewed in the drive D direction) and is engaged with the housing teeth 202. The abutment surfaces 505 of the clutch transmission ramps 502 are in full contact the respective facing drive faces 412 of the drive ramps 401 so that the clutch ring is spread outwardly forcing the toothed portion 501 and smooth portion 504 into or against the housing teeth 202. The clutch transmission ramps 502 progress up the respective drive ramps 401 until any play between the drive element 400, clutch portion 500 and head portion 200 is eliminated and the drive element 400, clutch portion 500 and head portion 200 are locked against each other in a strong pseudo laminate-like formation by which a suitably sized worked fastener 80 received in the drive aperture 407 can be turned by a torque applied via the fastener engaging surfaces 402 abutting the fastener drive surfaces 81. The clutch toothed portion 501 is fully engages the housing teeth 202 and the flat tops of the housing teeth 210 grip the smooth portion 504 of the said clutch outer surface 508.

When the wrench head 200 is turned in the d rive direction D and the wrench head, clutch ring 500 and drive element 400 are locked up, the gap 70 between the drive ramp walls 413 and the facing clutch shoulders 503 is at or around its maximum. The roll spring 100 is shown disposed within a resilient member recess 403 defined by the drive element 400.

Figures 5, 6:
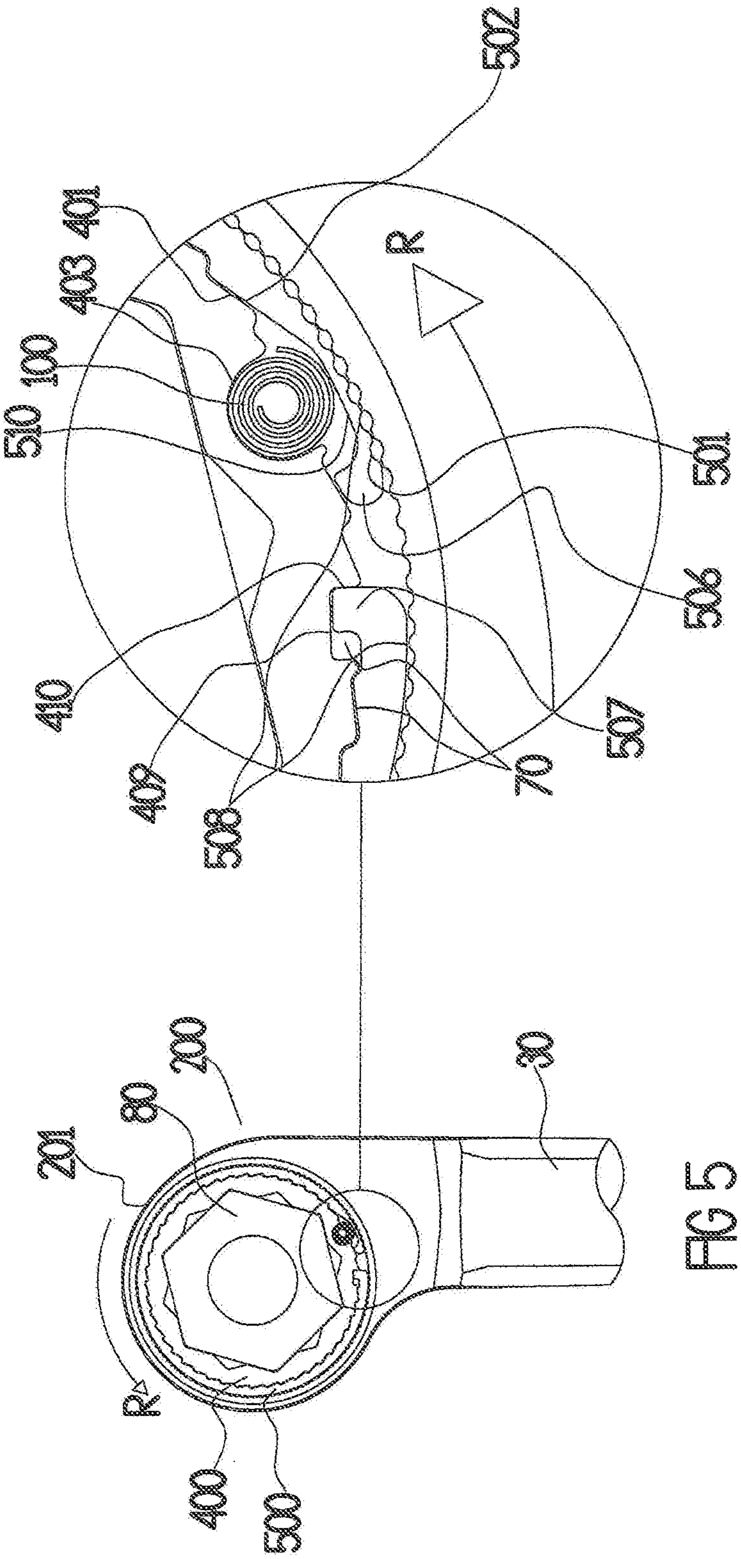
FIG. 5 is view corresponding to FIG. 3 showing the wrench head being turned in the reverse, or reposition, direction.
FIG. 6 an enlargement of a portion of FIG. 5.

FIGS. 5 and 6 illustrate the wrench head 200 with the seal 60 and seal retainer 61 omitted to allow parts below to be seen. The wrench head 200 is shown being turned in the reverse, or reposition, direction R. When the wrench head 200 is turned in the reverse direction R, the clutch transmission ramps 502 are propelled down the drive ramps 401 by the small gripping force engaging the clutch outer surface 508 with the housing inner sidewall 205 and optionally further utilizing the clutch protrusion 507, which may act against an end wall 410 of indent groove 409 defined by the drive element in order to limit the closing of the gap 70 between the drive ramps 401 and the facing clutch transmission ramps 502. This allows the engagement between the clutch outer surface 508 and the housing inner sidewall 205 to be released instead of deflecting into the gap 70 and provides a means of repositioning the wrench head 200 and handle 30 relative to the drive element 400.

When the wrench head 200, clutch ring 500 and drive element 400 are at rest, the clutch inner smooth section 510 and clutch toothed portion 501 are biased by the roll spring 100 into engagement with the facing housing teeth 202 to provide at least substantially instantaneous engagement, or meshing, by said clutch toothed portion 501 with the housing teeth 202 when the wrench head is turned in the drive direction (D).

Figure 8:
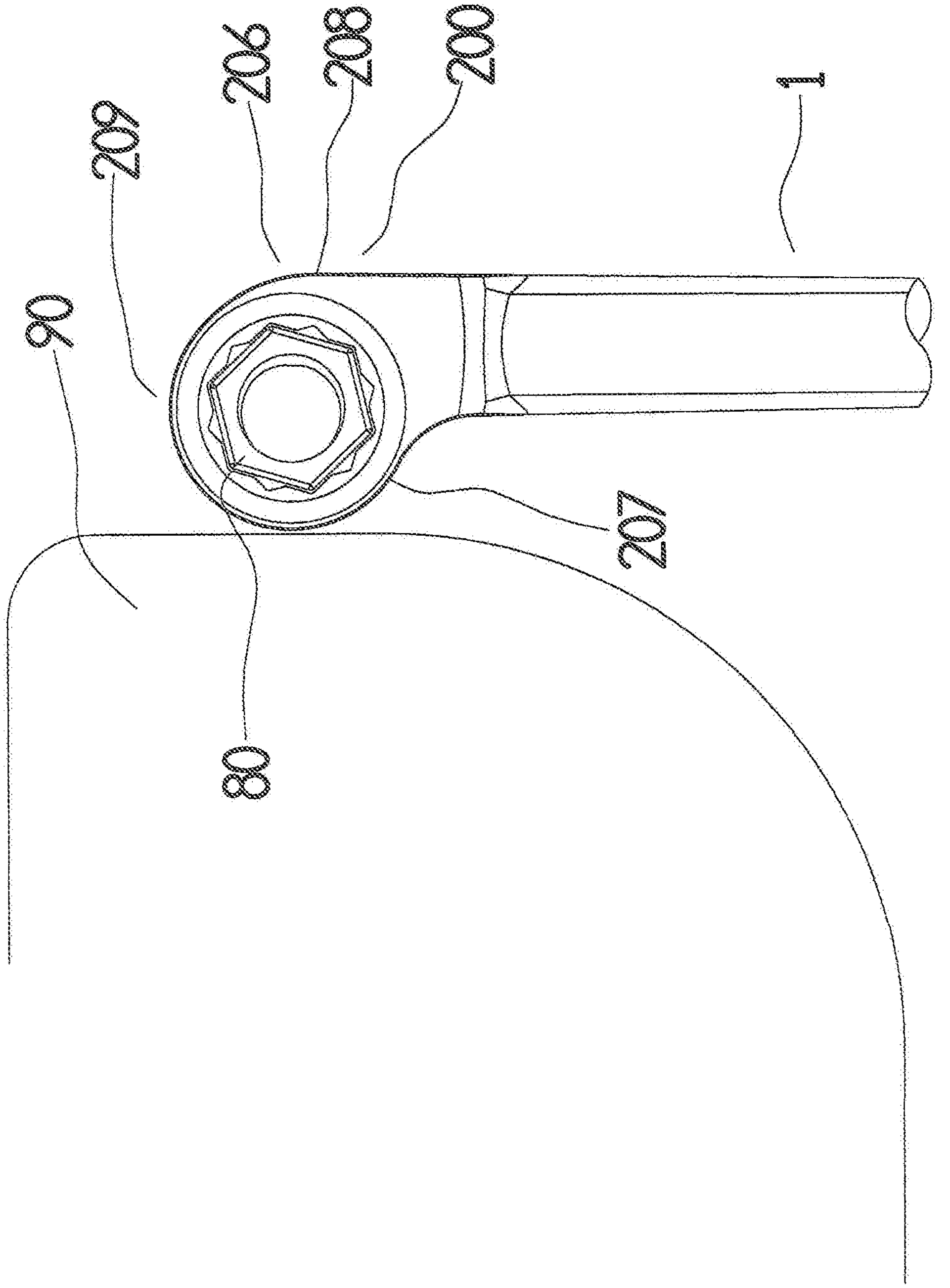
FIG. 8 shows the ratchet wrench in use on fastener located close to an obstruction.

FIG. 8 shows how the offset housing 206 reduced thickness section 209 of the wrench head 200 adjacent the first housing to handle connection 207 allows the ratchet wrench 1 to be used on fasteners 80 located in close proximity to obstructions 90 that could not be accessed by a conventional ratchet wrench.

Figure 9:
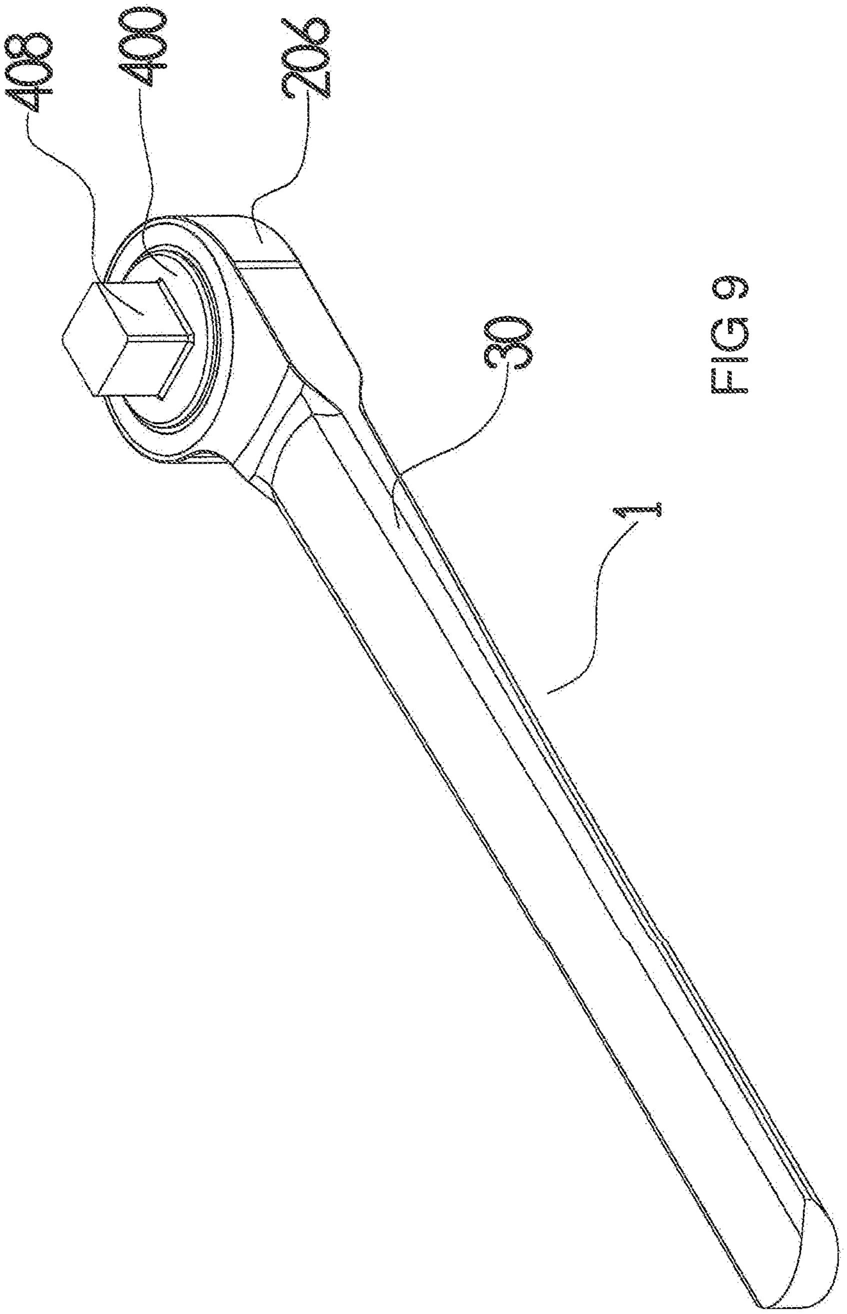
FIG. 9 shows the ratchet wrench provided with a drive spigot for use with square drive sockets.

FIG. 9 shows the ratchet wrench 1 with a drive spigot 408 fitted into the drive element 400 so that the wrench can be used with sockets of a socket set.

Figure 10:
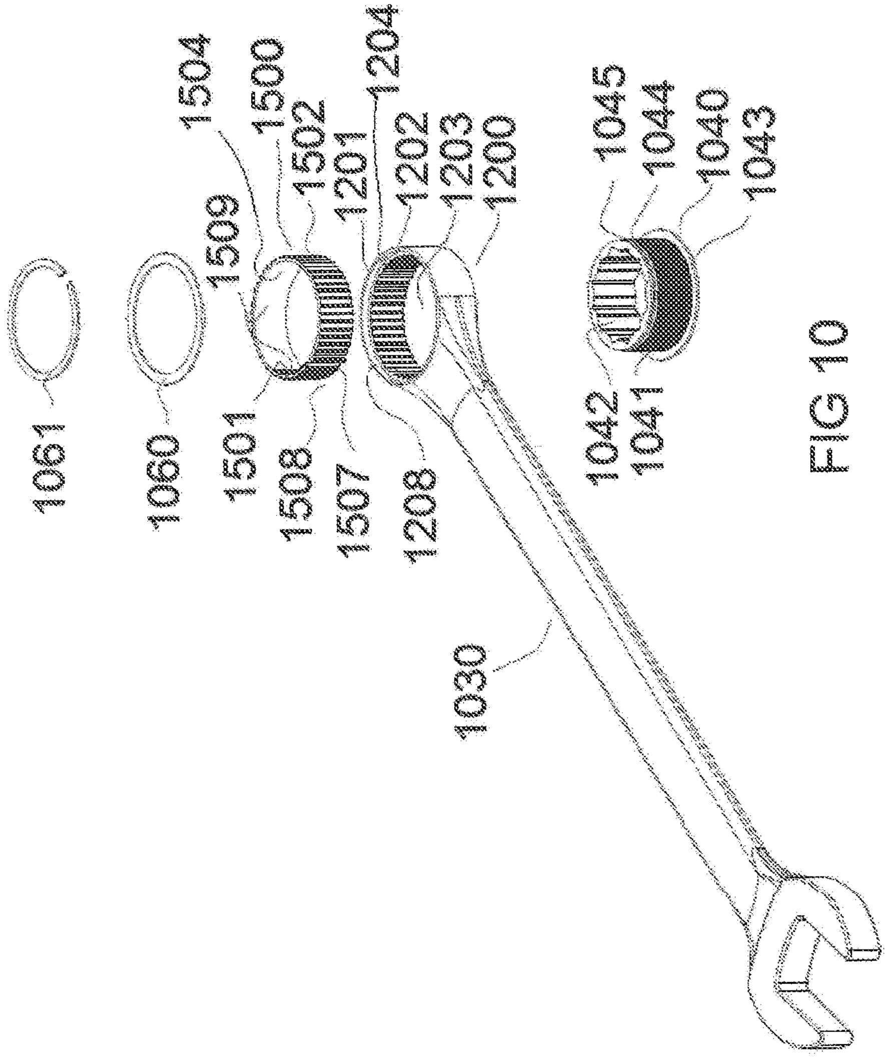
FIG. 10 is an exploded perspective view of another ratchet wrench.

Referring to FIG. 10 another ratchet wrench 1000 comprises a handle 1030, a wrench head 1200 that comprises a housing 1201 having a housing aperture 1203 defined by an inner sidewall 1208 provided with housing ramps 1202. The wrench head 1200 further comprise a seal retaining channel 1204. The wrench head 1200 is fitted with a drive element 1040 that has drive teeth 1041 provided on an outer sidewall 1045, a drive aperture 1046 defined by an inner sidewall that is provided with fastener engaging surfaces 1042, a sealing portion 1043 and a seal retaining channel 1044. An annular clutch in the form of a clutch ring 500 is disposed between the housing inner sidewall 1208 and the drive element 1040.

The clutch ring has an inner surface 1509 provided with a clutch toothed portion 1501 and a clutch smooth portion 1504, clutch transmission ramps 1502 and a clutch protrusion 1507 The wrench head 1200 is provided with a seal 1060 and seal retainer 1061.

Figure 12:
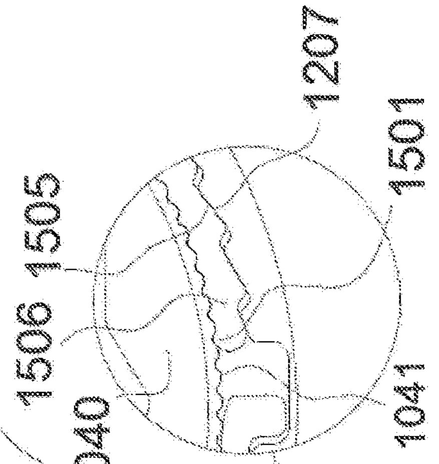
FIG. 12 is an enlargement of a portion of FIG. 11.
Figure 11:
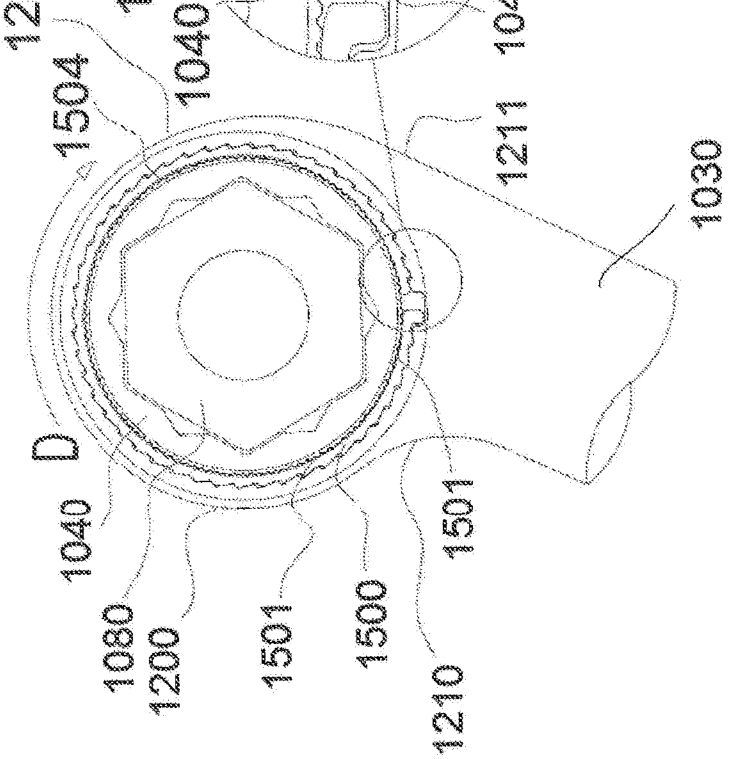
FIG. 11 is a top plan view of the wrench head of the ratchet wrench of FIG. 10 when being turned in a drive direction.

FIGS. 11 and 12 show the wrench head 1200 with the seal 1060 and seal retainer 1061 omitted to allow the parts below to be seen. The wrench head 1200 is offset with respect to the handle 1030 so that the wrench head and handle 30 have a generally P-shaped profile. As with the ratchet wrench 1, the wrench head 1200 has a first housing to handle connection 1210 *h* that is thinner than a second housing to handle connection 1211. The wrench head 1200 is shown being turned in the drive direction D. The clutch toothed portion 1501 at the leading end 506 of the clutch ring 1500 (in the drive direction D) is engaged with the drive teeth 1041 on the drive element 1040. The abutment surfaces 1505 of the clutch transmission ramps 1502 fully contact the respective facing drive faces 1207 of the housing ramps 1202 causing the clutch ring 1500 to contract. The contraction of the clutch ring 1500 forces the toothed portion 1501 and smooth portion 504 into or against the drive teeth 1041. The housing ramps 1202 move along the respective facing clutch transmission ramps 1502 until any play between the drive element 1040, the clutch ring 1500 and the wrench head 1200 is eliminated so that the drive element 1040, said clutch ring 1500 and wrench head portion 1200 are locked against each other in a strong pseudo-laminate-like formation. The locking together of the wrench head 1200, clutch ring 1500 and drive element 1040 allows a torque to be transmitted from the wrench handle 1030 to a suitably sized fastener 1080 received in the drive aperture 1046 via the said fastener engaging surfaces 1042 abutting fastener drive surfaces 1081. The clutch toothed portion 1501 is fully engaged in the drive teeth 1041, while and the flat tops of the drive teeth 1048 gripping the smooth portion 1504 of the clutch inner sidewall 1509. When the wrench head 1200 is turned in the drive direction D and the wrench head, clutch ring 1500 and drive element 1040 are fully locked up, the gap 1070 between housing ramp walls 1206 and the corresponding clutch shoulders 1503 is at or around its maximum.

Figure 13:
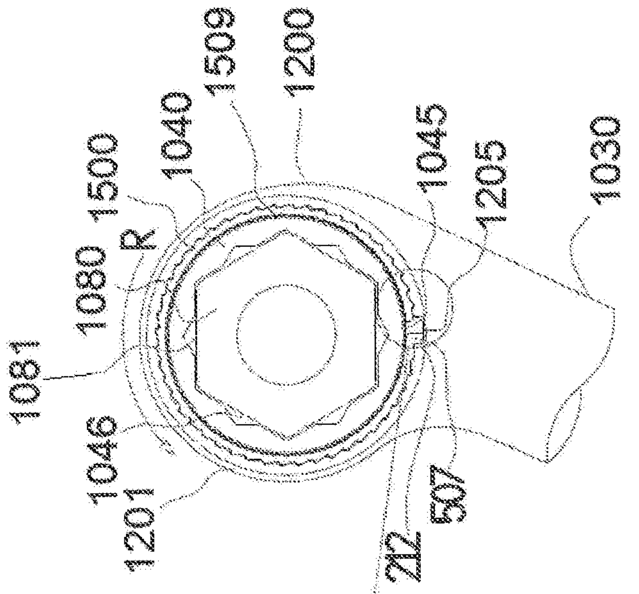
FIG. 13 is view corresponding to FIG. 11 showing the wrench head being turned in the reverse, or reposition, direction.
Figure 14:
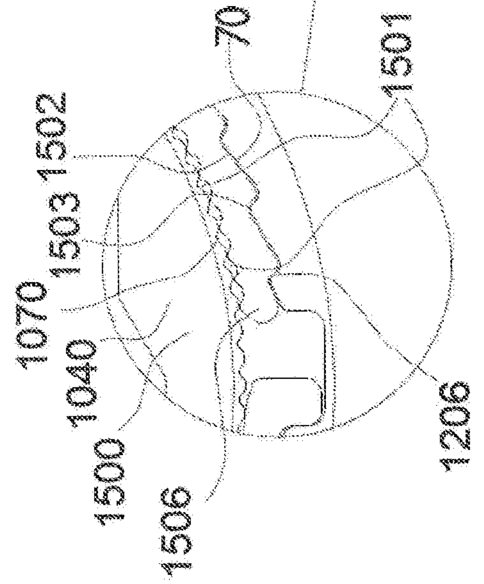
FIG. 14 an enlargement of a portion of FIG. 13.

FIGS. 13 and 14 correspond to FIGS. 11 and 12, but show the wrench head being turned in the reverse, or reposition, direction R. When the handle 1030 is turned in the reverse direction R, the said clutch transmission ramps 502 are moved back along the housing ramps 1202 by the small gripping force engaging the clutch inner surface 1509 with the outer sidewall 1045 of the drive element 1040 and optionally further utilizing the clutch protrusion 1507 against the end wall 1212 of the indent groove 1205 wall 212 in order to limit closing of the gap 1070. This allows the inner surface 1509 of the clutch ring to be released to from engagement with the outer sidewall 1045 of the drive element instead of deflecting into the gap 1070 and provides a useful means of repositioning the wrench head 1200 and handle 1030 relative to the drive element 1040. Referring to the FIG. 12, when the turning of the wrench head 1200 in the reverse direction R ceases and the wrench head is in a rest condition, the clutch ring 1500 resiles to a condition in which the toothed portion 1501 is lightly biased into engagement with the facing drive teeth 1041 in order to provide at least substantially instantaneous engagement, or meshing, with the drive teeth 1041 when the handle 1030 is turned in the drive direction D.

Thus, although there have been described particular embodiments of the present invention of a new and useful Ratchet Wrenches it is not intended that such references be construed as limitations upon the scope of this invention except as set forth in the following claims.

What is claimed is:

1. A ratchet wrench comprising:
- a wrench head comprising a housing having an outer sidewall and a housing aperture defined by an inner sidewall provided with a plurality of housing ramps;
- a handle having a first end connected with said wrench head;
- a clutch ring disposed in said housing aperture, said clutch ring having an outer surface and an inner surface that defines a clutch aperture, said outer surface of said clutch ring having a plurality of clutch transmission ramps and at least a portion of said inner surface of said clutch ring having a plurality of clutch teeth; and
- a drive element disposed in said clutch ring, said drive element having an outer surface provided with a plurality of drive teeth and an inner surface defining a drive aperture provided with fastener engaging surfaces;
- wherein rotation of said handle in a first direction causes said housing ramps to move along said clutch transmission ramps in said first direction to force said clutch ring to contract against said drive element to lock said housing, said clutch ring and said drive element together and rotation of said handle in a second direction opposite said first direction causes said housing ramps to move along said clutch transmission ramps in said second direction that is opposite said first direction along said clutch transmission ramps to allow said clutch ring to expand away from said drive element to release said lock so that said wrench head relative to said drive element.

2. The ratchet wrench as claimed in claim 1, wherein said housing is offset with respect to said handle.

3. The ratchet wrench as claimed in claim 1, wherein when said handle is turned in said first direction, said clutch teeth initially engage said drive teeth to cause said clutch transmission ramps to move in said first direction along said housing ramps.

4. The ratchet wrench as claimed in claim 1, wherein when said housing ramps move in said second direction along said clutch transmission ramps, said clutch transmission ramps move away from said drive element to allow said clutch ring to expand, thereby allowing said clutch teeth to disengage said drive teeth.

5. The ratchet wrench as claimed in claim 1, wherein said inner surface of said clutch ring has a smooth portion adjoining said portion that has said clutch teeth.

6. The ratchet wrench as claimed in claim 1, wherein said drive outer surface and said clutch inner surface have the same effective diameter.

7. The ratchet wrench as claimed in claim 1, wherein said wrench head has a first housing to handle connection and a second housing to handle connection, each of said housing to handle connections has a thickness, said thickness is the distance between said housing inner sidewall and said housing outer sidewall and the thickness of said first housing to handle connection is less than the thickness of said second housing to handle connection.

8. The ratchet wrench as claimed in claim 1, wherein said housing ramps have a length in a circumferential direction of said housing aperture, said clutch transmission ramps have a length in said circumferential direction and said housing ramps and clutch transmission ramps have a common ramp angle in said circumferential direction that is in the range eight degrees to thirty degrees.

9. The ratchet wrench as claimed in claim 1, wherein an outside distance width of said head portion is 90% less than the ASME standards depth for the outside diameter of a standard box head wrench.

10. The ratchet wrench as claimed in claim 1, wherein said housing has a width and said drive aperture has an across flats dimension and said width is less than two times said across flats dimension.

11. A ratchet wrench comprising:

a wrench head comprising a housing having an outer sidewall and a housing aperture defined by an inner sidewall provided with a plurality of housing ramps;

a handle having a first end connected with said wrench head;

a clutch ring disposed in said housing aperture, said clutch ring having an outer surface and an inner surface that defines a clutch aperture, said outer surface of said clutch ring having a plurality of clutch transmission ramps and at least a portion of said inner surface of said clutch ring having a plurality of clutch teeth; and a drive element disposed in said clutch ring, said drive element having an outer surface provided with a plurality of drive teeth and an inner surface defining a drive aperture provided with fastener engaging surfaces, wherein said clutch ring is a split ring having opposing ends and a circumference defining oppositely directed circumferential directions, a first one of said opposing ends having a radially projecting clutch protrusion held in a recess provided in said inner sidewall of said housing, wherein rotation of said handle in a first direction causes said housing ramps to move along said clutch transmission ramps in a first direction to force said clutch ring to contract against said drive element to lock said housing, clutch ring and drive element together and rotation of said handle in a second direction opposite said first direction causes said housing ramps to move along said clutch transmission ramps in a second direction that is opposite said first direction along said clutch transmission ramps to release said wrench head for rotation relative to said drive element, and wherein in said circumferential directions, said recess is larger than said protrusion to permit back and forth rotation of said recess relative to said protrusion in said circumferential directions in response to said rotation of said handle in said first and second directions.

12. The ratchet wrench as claimed in claim 11, wherein said clutch teeth are provided adjacent said second end of the clutch ring.

* * * * *